(12) United States Patent
Hartmann et al.

(10) Patent No.: US 6,545,250 B2
(45) Date of Patent: Apr. 8, 2003

(54) METHOD AND APPARATUS FOR THE LASER MACHINING OF WORKPIECES

(75) Inventors: Andreas Hartmann, Dresden (DE); Frank Kretzschmar, Rückersdorf (DE); Annett Klotzbach, Dresden (DE); Lothar Morgenthal, Dresden (DE); Dieter Pollack, Dresden (DE); Thomas Schwarz, Bannewitz (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/748,632

(22) Filed: Dec. 22, 2000

(65) Prior Publication Data

US 2001/0023862 A1 Sep. 27, 2001

(30) Foreign Application Priority Data

Dec. 22, 1999 (DE) ......................... 199 63 010

(51) Int. Cl.[7] .............................................. B23K 26/02
(52) U.S. Cl. ........................... 219/121.83; 219/121.69; 219/121.72
(58) Field of Search ...................... 219/121.83, 121.69, 219/121.72, 121.67, 121.68, 121.7, 121.73

(56) References Cited

U.S. PATENT DOCUMENTS

| | | | | |
|---|---|---|---|---|
| 3,920,951 A | * | 11/1975 | Chovan et al. | 219/121 L |
| 4,556,964 A | * | 12/1985 | Trethewey | 369/44 |
| 5,856,880 A | * | 1/1999 | Farina et al. | 359/43 |
| 6,188,078 B1 | * | 2/2001 | Bell, Jr. et al. | 250/559.1 |
| 6,320,658 B1 | * | 11/2001 | Mizutani | 356/399 |

* cited by examiner

Primary Examiner—M. Alexandra Elve
(74) Attorney, Agent, or Firm—Leydig, Voit & Mayer, Ltd.

(57) ABSTRACT

The invention relates to a method and an apparatus for the laser machining of workpieces, a laser beam being two-dimensionally positionable with the aid of a laser machining head with respect to a surface of a workpiece and it being intended for the machining of the workpiece to take place with predeterminable contours. According to the object, it is to be possible for the forming of the contours to be realized with high positional accuracy at low cost and with little effort. To achieve this object, the laser beam is correspondingly guided by means of a laser machining head, in which at least one two-dimensionally pivotable scanner mirror is accommodated. The scanner mirror or two scanner mirrors is/are connected to an electronic evaluation and control unit. Before the actual machining, a set-actual value comparison is carried out with respect to the position of the workpiece with at least one predetermined contour with respect to the laser machining head. For this purpose, a light beam of a light source is focused and directed via one or else two scanner mirror(s) onto the surface of the workpiece and deflected along at least one axis by pivoting at least one of the scanner mirrors. The light reflected from the workpiece surface passes via the scanner mirror or mirrors onto an optical detector and is focused onto the latter. Taking into account the respective pivoting angle of the scanner mirror (s), the measuring signals of this optical detector are fed to the electronic evaluation and control unit, so that the deflection of the laser beam can be controlled during the machining in dependence on the actual position of the contour ascertained in this way for the machining.

8 Claims, 4 Drawing Sheets

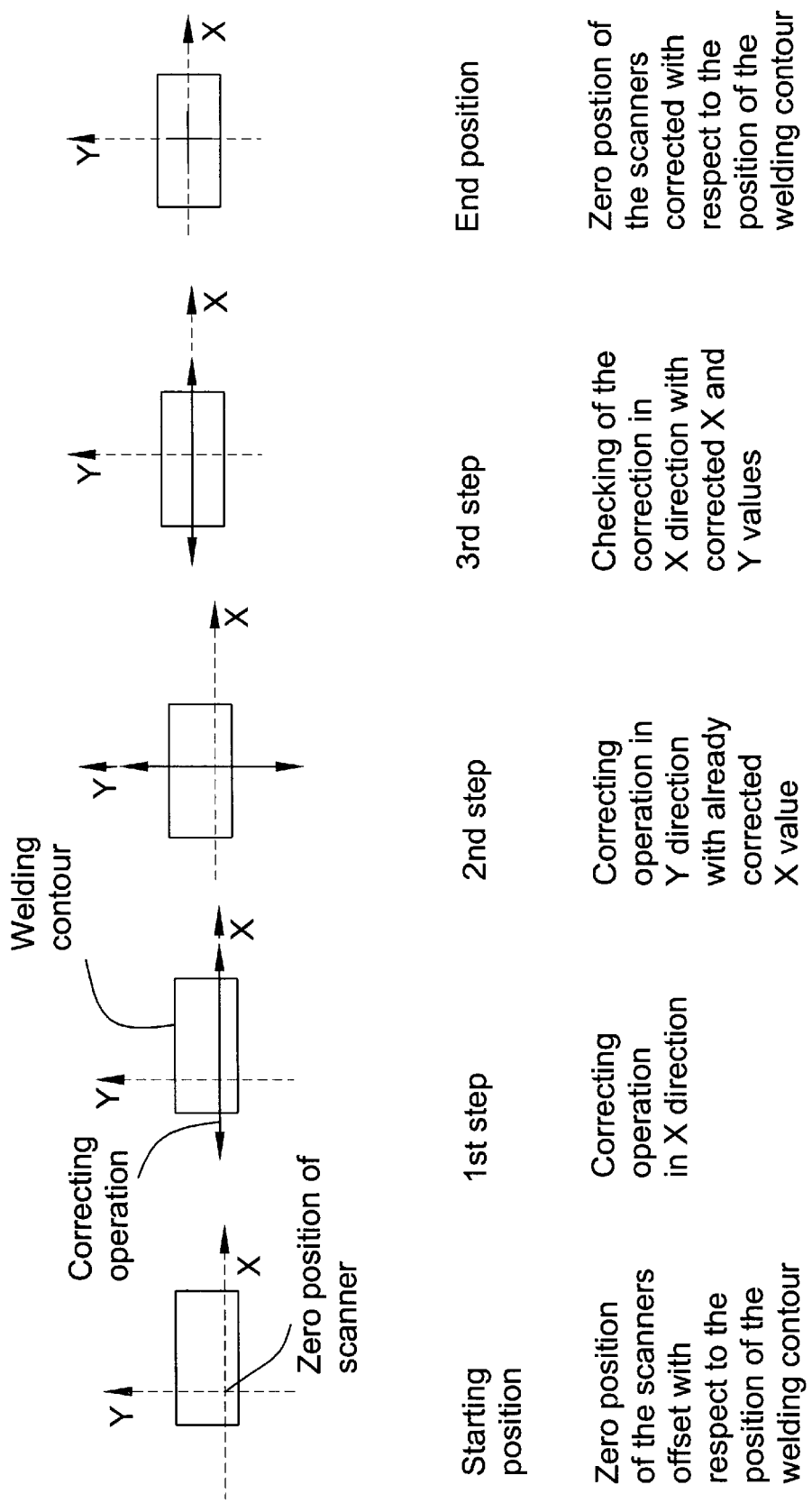

METHOD AND APPARATUS FOR THE LASER MACHINING OF WORKPIECES

The invention relates to a method and an apparatus for, the laser machining of workpieces, a laser beam being two-dimensionally positionable with the aid of a laser machining head with respect to a surface of a workpiece and it being intended for the machining of the workpiece to take place with predeterminable contours. The corresponding contours should as far as possible be in the form of closed lines, it being possible for a wide variety of geometrical shapes to be concerned, such as circles, triangles, squares, rectangles and others.

For a laser machining operation, usually one positioning of the laser machining head, with the aid of which a laser beam can be deflected and shaped, takes place by a corresponding relative movement with respect to the workpiece. The positioning.may in this case take place by two-dimensional movement of the laser machining head or of the workpiece alone or by simultaneous corresponding movement of these two elements.

If the laser beam is consequently to be guided or deflected over the surface of a workpiece in a way corresponding to the respective predetermined contour, in order for example to carry out a welded connection or some other targeted local heat treatment, or to produce a correspondingly contoured opening in the workpiece by a cutting operation, problems arise, in particular in the case of small-format and filigree structures, and the required positioning accuracy cannot in every case be ensured by the conventional drive mechanisms for the laser machining head or the workpiece, in particular at high machining speeds.

Furthermore, distortion which has occurred as a consequence of previous machining steps on the workpiece may also lead to corresponding dimensional and positional errors, so that the required positioning accuracy cannot be achieved in every case.

If, for example, hollow profiles, in particular thin-walled hollow profiles, are to be butt-welded into openings of a metal sheet by means of a laser beam, as far as possible without filler material, extremely high positional accuracy is required in the alignment and movement of the laser beam, so that the latter must be guided very accurately along the contour which is predetermined as the gap between [lacuna] corresponding to the outer contour and dimensions of the hollow profile and the opening formed in a corresponding way in the metal sheet, in order to be able to produce an adequately solid and sealed connection between the metal sheet and the respective hollow profile. The distortion mentioned may in this case already lead to corresponding positioning and alignment errors, so that production errors may occur with a set of hollow profiles to be welded if no correction of possibly occurring dimensional and positional errors is carried out.

Known positioning aids are, for example, separate markings which can be sensed by suitable sensors which are arranged externally. With the aid of such elements, a corresponding relative movement is generally initiated in order to correct the positioning error which has occurred, which leads to increased expenditure of time since this usually has to be carried out in several stages. With these means, however, it is only possible with difficulty, if at all, to compensate for positioning errors as a consequence of distortion.

If known image processing systems are used for monitoring the positional accuracy, the cost for a corresponding installation increases and an image sensing system required for this purpose must be arranged in such a way that it can monitor the respective machining area under all conditions, so that it is essential to evaluate a perspective image with correspondingly increased computing power.

It is therefore the object of the invention to propose possible ways in which high positional accuracy can be ensured in the laser machining of workpieces in predetermined contours at low cost and with little effort.

This object is achieved according to the invention by the features of claim 1 for a corresponding method and the features of claim 9 for a corresponding apparatus. Advantageous embodiments and developments of the invention are obtained with the features specified in the subordinate claims.

The solution according to the invention falls back on a laser machining head known per se, which can be designed for beam guidance and shaping, at least one scanner mirror allowing a deflection of the laser beam in two dimensions being used in each case. This may, for example, be a cardanically suspended scanner mirror, allowing a deflection of the laser beam in two axes aligned orthogonally with respect to one another over the surface of a workpiece.

For cost reasons, and possibly to increase the deflecting speed of a laser beam, it is, however, also quite possible to use two separate scanner mirrors which are arranged one after the other in the path of rays of the laser beam.

In this case, each of the scanner mirrors has a pivoting drive and an angle encoder, which are connected to an electronic evaluation and control unit, so that a defined pivoting of the scanner mirror or mirrors is possible by an electronic control, with simultaneous feedback, i.e. transmission of the respective angular positions of the scanner mirror(s).

Optionally, a focusing element may be arranged in the laser machining head, but also outside it, in the path of rays of the laser beam, it being possible, likewise optionally, for this to be a simple lens or a zoom lens.

Added to this, an additional light source, for example a laser diode, is used, the light beam of which can likewise be directed onto the scanner mirror or mirrors in a focused form.

With the aid of this light beam, an actual-set value comparison is carried out before the actual laser machining with respect to the positioning of the workpiece to be machined with predeterminable machining contours with respect to the laser machining head. In this case, the laser beam is deflected with the aid of the scanner mirror or mirrors over the surface of the workpiece, light from the surface of the workpiece being reflected back during the deflection and directed via the scanner mirror or mirrors onto an optical detector, by which the intensity of the reflected light can be measured. Since the corresponding measured light intensity values of the angular position or positions of the one or more scanner mirror(s) are sensed in an assigned form, predetermined contours on the surface of the workpiece can be detected and locally assigned with their contour edges or contour limits by the fall and/or rise of the measured intensity of the reflected light.

Since not only the shape but also the size and position of the respective machining contour are stored in the evaluation and control unit, a set-actual value comparison can be carried out with the measured position and the stored position, and the measured deviation of the shape, size or position of the contour from the set values can be compensated by intervention in the control program for the deflection of the laser beam, without a relative movement of the laser machining head and/or workpiece having to be carried out.

In the simplest and most favorable case, it may be adequate for the positional determination of the respective contour on the surface of the workpiece to carry out a deflection of the light beam along one axis, it then being possible with such a light beam deflection for at least two contour edges or contour limits to be sensed. This fact can be utilized in particular in the case of symmetrically designed contours.

Generally, however, a deflection of the light beam over the, surface of the workpiece along at least two axes will be required to determine the actual position of the laser machining head with respect to the contour formed on the surface of the workpiece or arranged there.

The axes in which the light beam is deflected may in this case be aligned parallel to or at a known angle with respect to one another, it undoubtedly being particularly favorable in many cases to carry out a deflection along axes aligned orthogonally with respect to one another in order to keep the measuring accuracy in the positional determination of the contour relatively high.

There is, however, also the possibility of deflecting the light beam by means of the scanner mirror(s) in such a way that it follows the stored predetermined contour and the deviations from the set position of the contour can be ascertained by corresponding rising or falling of the measured intensity of the reflected light with the aid of the simultaneously measured and assigned angle data of the scanner mirrors, it being possible in turn to compensate for these deviations by corresponding control of the beam deflection of the laser beam during the laser machining to be subsequently carried out.

With the aid of the values ascertained in this way, the actual position coordinates of the respective machining contour and, in the case of a known geometry and size of the respective machining contour, also its center point or centroid can then be determined, it then being possible to use the calculated center point coordinates for controlling the deflection of the laser beam for the machining.

The method according to the invention for determining the actual position of a machining contour formed on or applied to a workpiece surface can be carried out in particular in the case of symmetrical contours in such a way that, for determining the center axis, the light beam is aligned along an axis which is orthogonal to the first axis, in which the light beam is first guided. Following this, the light beam is deflected on the center axis ascertained in this way, so that the center point, for example of a circular, square or else rectangular contour, can be readily determined relatively quickly and simply. If required, this can be carried out iteratively in a number of steps.

The invention may be advantageously used for welding hollow profiles into workpieces in which openings have been formed in a way corresponding to the size and contour of the respective hollow profiles.

For this purpose, the corresponding hollow profiles can be introduced into the openings in the workpiece, normally with their end faces in line with, or forming defined edges with, the surface of the workpiece which is pointing in the direction of the laser machining head.

Once the position of the gap between the inside wall of the opening and the outside wall of the hollow profile has been ascertained with the aid of the correspondingly deflected light beam, via the evaluation of the light intensity values of the reflected light assigned to the respective pivoting angles of the scanner mirror(s), a possibly required compensation of the positional difference, between the predetermined set position and the position actually determined, can take place by correspondingly considered deflection of the laser beam. As a result, the respective hollow profile is welded to the workpiece in a positionally exact manner directly in the gap, so that a uniform, adequately solid and sealed weld can be formed.

With the solution according to the invention, hollow profiles with relatively small dimensions and thin walls can be welded with high accuracy into such a workpiece, for example a metal sheet, it being possible to use a wide variety of metals as materials for the workpiece and hollow profiles, so that there is great applicational variety.

The invention may, however, also be used for laser machining methods other than welding. In this case, the respective machining contour may be predetermined not only by a corresponding opening in the workpiece, but instead simply by the requirement that a changed reflecting property occurs at or on the corresponding machining contour in comparison with the adjacent surface of the workpiece. For example, a machining contour may be formed.as a groove-shaped depression on the surface of the workpiece.

However, a layer of a material with higher reflection or higher absorption of the light used for the light beam may also have been applied in such a way that it follows the machining contour, which has the result that, when the light beam is deflected correspondingly, there is a rise or fall in the light intensity measured by the optical detector when said light beam passes over a machining contour marked in this way.

With the method according to the invention, it is consequently also possible for correspondingly contoured openings to be cut into a workpiece or for a targeted local heat treatment to be carried out, in order for example to change .the hardness of such a workpiece in a locally targeted way or to introduce internal stress into the workpiece material in a locally targeted way.

In order to direct the light beam of the light source onto the surface of the workpiece with a relatively small light spot, it is favorable to arrange a focusing optical element, for example a convex convergent lens, in its path of rays before said light beam impinges on the scanner mirror(s).

Since the light beam should be aligned at least partially parallel to the laser beam of a laser light source, it is advantageous to arrange a beam splitter, for example an optical window, which preferably consists of ZnSe, in the path of rays of the light and laser beams. In this case, either the light beam or the laser beam is reflected at a surface of such a window and is correspondingly deflected, and the other beam, respectively, which is directed onto the window from the other side, can pass through it in a nondeflected form.

Both the laser beam and the light beam can then be directed by a focusing element, for example a focusing mirror, onto the scanner mirror or mirrors and be deflected with their aid correspondingly over the surface of the workpiece, the deflection taking place with the aid of pivoting drives of the scanner mirrors, a feedback of the respective pivoting position to an evaluation and control unit taking place with the aid of angle encoders, which are preferably integrated in the pivoting drives.

However, when there is a constant pivoting speed of the scanner mirrors, an assignment over time may also be carried out.

To simplify matters, is may be advantageous to digitize the generally analog measured values of the angle encoders with the aid of analog-digital converters and to use them in this form in the electronic evaluation and control unit for the already described set-actual value comparison, which compares the set value with the determined actual position of a corresponding machining contour.

The light of the light beam reflected at the surface of the workpiece then returns via the scanner mirror(s), through the window, as a beam splitter, and the reflected light is deflected with the aid of a further beam splitter and directed onto a fixed optical detector. The detector is in turn connected to the electronic evaluation and control unit, so that the respective measuring signal, the measured light intensity of the reflected light, can be assigned with the aid of the angle signals or the time to an exact position on the surface of the workpiece.

It goes without saying that at least the laser light source is also connected to the electronic evaluation and control unit, in order to control at least the switching on and off of the laser light source in a specifically selective manner, so that the laser machining is only carried out on the respective machining contour when the actual position of the machining contour has been determined.

It goes without saying that it is also possible to connect the light source emitting the light beam to the electronic evaluation and control unit.

The optical unit formed by the light source, optical detector and at least one beam splitter may be integrated directly in the laser machining head or be connected.to conventional laser machining heads, or be flange-mounted there, it being possible in the last case for the light beam to be directed through a corresponding.window, aligned orthogonally with respect to the light beam, into the laser machining head, onto the already mentioned beam splitter (optical window) Furthermore, the already repeatedly mentioned and described scanner mirrors with their pivoting drives and angle encoders may be integrated in the laser machining head. An additional focusing optical element may also be present there, it being possible for this to be a beam-shaping element with variable focal length.

The invention is to be described in more detail below on the.basis of exemplary embodiments.

In the drawing:

FIG. 3 shows diagrams and approaches for determining the center point of machining contours formed on or in workpieces and FIG. 4 shows a sequence of several steps for determining the center point of a rectangular machining contour.

Figure 1:
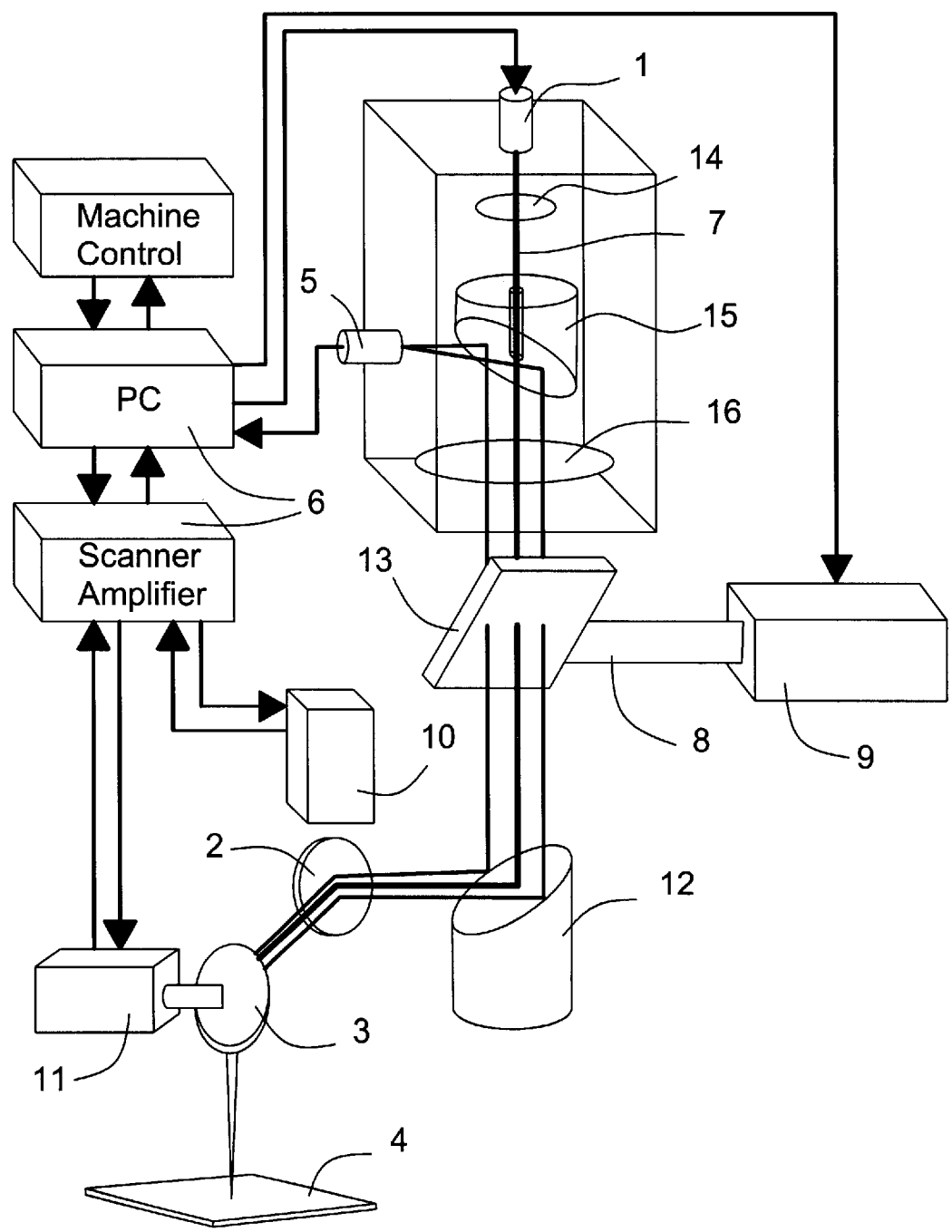
FIG. 1 shows the schematic construction of an example of an apparatus according to the invention.

In FIG. 1, the schematic construction of an apparatus according to the invention is shown. In this example, a laser diode is used as the light source 1, with a wavelength λ=690 nm and a light output of 10 milliwatts. In this example, the light beam 7 passes via a first convergent lens 14 through a first beam splitter 15, the light beam 7 being directed through a bore in the first beam splitter 15 onto a second convergent lens 16 and further directed by the latter, in a focused form, through a second beam splitter 13, here a ZnSe window, onto a focusing mirror 12 and from there via scanner mirrors 2 and 3 onto the surface of a workpiece 4. By corresponding pivoting of the scanner mirrors 2, 3, in axes respectively aligned orthogonally with respect to .one another, the light beam 7 can be moved over the surface of the workpiece 4, for determining the actual position of contours arranged on the surface of the workpiece 4 or formed there, pivoting in one or more axes or tracing of the set contour being possible, as already explained in the general part of the description, by corresponding manipulation of the pivoting drives 10 and 11 of the scanner mirrors 2 and 3. In this case, the controlling of the pivoting movement of the scanner mirrors 2 and 3 takes place by means of the electronic evaluation and control unit 6, which at the same time senses the respective angular position of the two scanner mirrors 2 and 3 and assigns in an angle-related manner the intensity measured by the optical detector 5 of the light possibly reflected from the surface of the workpiece 4.

It goes without saying that light can only be reflected from the surface of the workpiece 4 if the light beam 7 does not impinge on an opening or absorbent surface areas. There is also no light, or virtually no light, reflected via the scanner mirrors 2 and 3 to the optical detector 5 from surface areas which deviate from the normal to the surface which points in the direction of the incident light radiation.

Figure 2:
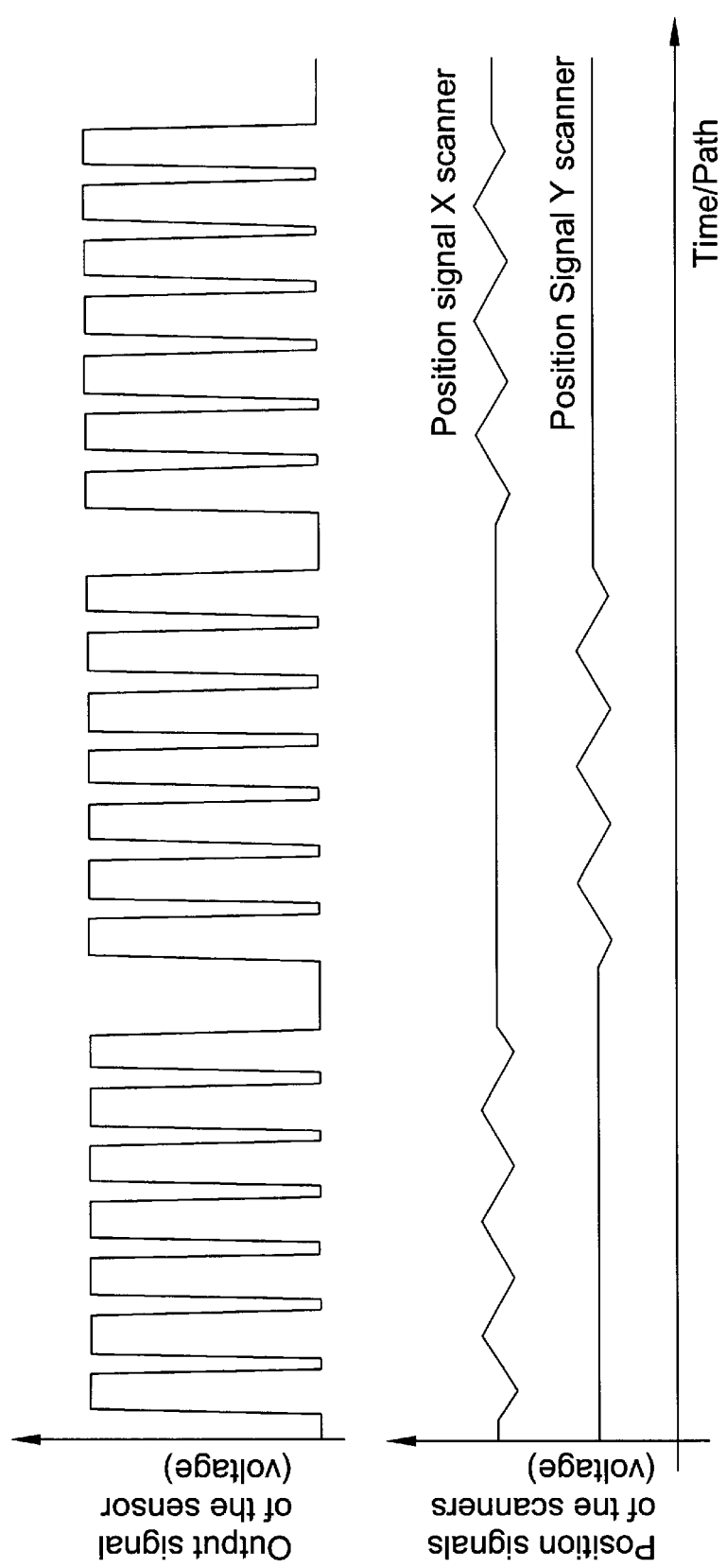
FIG. 2 shows diagrams of the measuring signals of the optical detector and of the angle encoders of the pivoting drives of scanner mirrors in the case of a deflection of the laser beam in two axes aligned orthogonally with respect to one another.

In FIG. 2, the measuring signals of the angle encoders, of the pivoting mechanisms 10 and 11 and the respectively assigned measuring signal of the optical detector 5 are represented in a time-dependent and/or path-dependent manner. In this case, the deflection of the light beam 7 takes place with the aid of the scanner mirrors 2 and 3 in two axes aligned orthogonally with respect to one another, that is to say in the x direction and y direction. With the represented profile of the measuring signal of the optical detector 5 it can be clearly seen when or where light of the light beam 7 reflected on the surface of the workpiece 4 is sensed by the optical detector 5 and the light beam 7 impinges on a reflecting surface of which the normal to the surface points in the direction of the incident light beam 7 and the light reflected there reaches the optical detector 5.

If the light beam 7 enters a bore or opening of some other form or impinges on a surface of which the normal to the surface deviates from the direction of the incident light beam 7, no light or only a relatively small part of light reflected from the surface of the workpiece 4 reaches the optical detector 5. If the light beam 70 is then deflected, as already mentioned, along the x-axis and along the y-axis, the measuring signals shown in the above representation can be sensed by the optical detector 5.

For the positional determination of the respective measuring signal, an assignment takes place of the actual measured value, of the optical detector 5, with the angle signals, of the angle encoders, of the two pivoting drives 10 and 11 and of the scanner mirrors 2 and 3.

Figure 3:
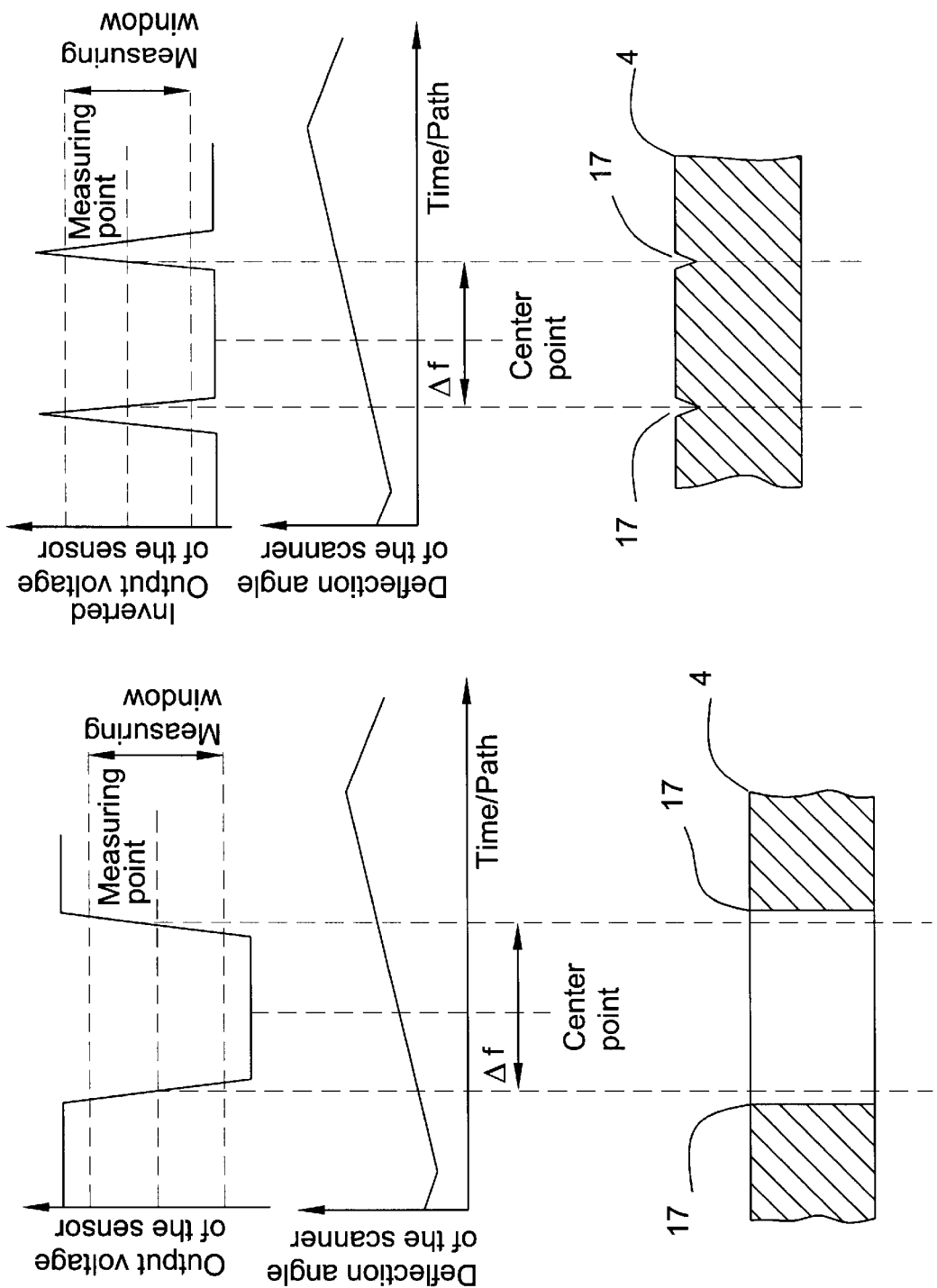

In FIG. 3, two examples of the sensing of the position of machining contours 17, which are formed in or on different workpieces 4, are represented. Shown in the left-hand representation is a workpiece 4 with a bore as the machining contour 17 and shown in the right-hand representation is a machining contour 17 formed on the workpiece surface in the form of a groove-shaped notch.

Represented as assigned to the two examples is the measuring signal profile of the optical detector 5, in dependence on the pivoting angle, at least of one scanner mirror, the profile of the rising and falling edges of the measuring signal being clear to see for both examples.

Since the size, shape and type of machining contour 17 are generally known, a measuring window can be fixed within the minima and maxima of the measured light intensities, a middle range, between the measured minimum and the measured maximum, being favorably selected for this purpose as the measuring window. By averaging within this measuring window at the rising and falling edges of the measuring signal, the center point of the respective machining contour 17 can then be readily determined by subtraction.

As is indicated at the coordinates of the diagrams for the deflecting or pivoting angles of the scanner mirrors 2, 3, the determination of the average value of the machining contour 17 can take place both on a time basis and on a path basis.

Since the evaluation of the measuring signal of the optical detector 5 is merely carried out in the range of the measuring window, errors caused by noise can be excluded.

In FIG. 4, it is indicated in a number of steps how the position of the center point of a rectangular machining contour can be determined iteratively. In this example as well, the evaluation should preferably take place in the range of the measuring window of the measuring signals of the optical detector 5. A measuring point at which the difference in the pivoting angles Δf of the corresponding scanner mirror between a falling edge and rising edge of the measuring signal is ascertained is determined within this measuring window. The pivoting angle of the corresponding scanner mirror 2 or 3 which belongs to the center point of the secant scanned by the machining contour can be determined by halving this difference. This operation is repeated until a fixed deviation of the center points from one another is no longer exceeded. Once the center point along the first axis has been determined with adequate accuracy, the corresponding measurement can be carried out in a second step in the direction aligned orthogonally with respect to said first axis, that is to say in the y direction, although in this case the deflection of the laser beam 7 should be carried out already in the previously determined center axis of the machining contour 17, which has been ascertained in advance.

In the third step, the result of the measurements is repeated in the direction of the x-axis and this result is checked.

After determination of the center point of the machining contour, this positional information can be used for controlling the deflection of the laser beam 8 for the corresponding laser machining.

What is claimed is:

1. A method for the laser machining of workpieces comprising directing a laser beam by means of a laser machining head, in which at least one two-dimensionally pivotable scanner mirror connected to an electronic evaluation and control unit is accommodated, onto a workpiece for machining the latter with predeterminable contours and, before the laser machining, a set-actual comparison of the position of the workpiece is carried out with at least one predetermined contour with respect to the laser machining head, wherein a light beam of a light source, focused by means of the one or two scanner mirror(s), is directed onto the surface of the workpiece and is deflected along at least one axis by pivoting at least one scanner mirror and light reflected from the workpiece surface is directed in a focused manner onto an optical detector via the scanner mirror(s);

feeding the measuring signals of the optical detector to the electronic evaluation and control unit in dependence on the respective pivoting angle of the scanner mirror(s) and controlling the deflection of the laser beam during the machining in dependence on the actual position of the contour ascertained in this way for the machining.

2. The method as claimed in claim 1, wherein before the laser machining, the light beam is directed along at least two axes which are aligned parallel or at a certain angle with respect to one another, or following the predetermined machining contour, onto the workpiece surface by corresponding pivoting of the scanner mirror(s) and the intensity of the reflected light, measured by the optical detector, for the respective pivoting angle of the scanner mirror(s) is fed to the electronic evaluation and control unit.

3. The method as claimed in claim 1, wherein the center point or the centroid of the respective machining contour is determined.

4. The method as claimed in claim 1, wherein the light beam is guided over the workpiece surface along one axis for determining the position of the center axis, the machining contour in the axis aligned orthogonally with respect to said center axis and then along this center axis for determining the center point of the machining contour.

5. The method as claimed in claim 1, wherein the position of the contour edge or limit is determined within a measuring window, which lies in the interval within the minimum and maximum measurable light intensity of the optical detector, by averaging at the falling and/or rising edge of the measuring signal.

6. The method as claimed in claim 1, wherein, following the determination of the position of machining contours formed as openings in the workpiece, hollow profiles aligned and dimensioned in a way corresponding to the machining contour are welded to the workpiece by means of the correspondingly deflected laser beam.

7. The method as claimed in claim 1, wherein a machining contour with changed reflecting properties is applied to or formed on a workpiece surface and, after determining the position with respect to the laser machining head, is machined or subjected to a heat treatment by the laser beam.

8. The method as claimed in claim 7, wherein an opening is cut out in the workpiece by the laser beam, following the machining contour.

\* \* \* \* \*